US008174226B2

(12) United States Patent
Tsai et al.

(10) Patent No.: US 8,174,226 B2
(45) Date of Patent: May 8, 2012

(54) CURRENT LIMIT CONTROL METHOD OF DC MOTOR AND RELATED DEVICE AND CIRCUIT

(75) Inventors: Ming-Jung Tsai, Chang-Hua (TW); Ching-Sheng Li, Hsinchu County (TW); Kun-Min Chen, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 434 days.

(21) Appl. No.: 12/512,024

(22) Filed: Jul. 30, 2009

(65) Prior Publication Data
US 2010/0244757 A1 Sep. 30, 2010

(30) Foreign Application Priority Data
Mar. 24, 2009 (TW) ................................. 98109619 A (51) Int. Cl.
*H02P 7/00* (2006.01)
*H02P 3/12* (2006.01)
*H02P 6/04* (2006.01)
*H02P 23/12* (2006.01)
*G05B 19/40* (2006.01)

(52) U.S. Cl. .................. 318/434; 318/379; 318/400.11; 318/400.14; 318/459; 318/685
(58) Field of Classification Search .................. 318/379, 318/400.11, 400.14, 434, 459, 685
See application file for complete search history.

(56) References Cited

U.S. PATENT DOCUMENTS

| 4,453,115 | A  | * | 6/1984  | Yoshida ........................ 318/434 |
| 6,377,008 | B1 | * | 4/2002  | Hirata ........................... 318/459 |
| 6,906,484 | B1 | * | 6/2005  | Berroth et al. ................. 318/434 |
| 6,906,489 | B2 | * | 6/2005  | Fukamizu et al. ............. 318/685 |
| 7,859,205 | B2 | * | 12/2010 | Mori et al. ..................... 318/379 |
| 2008/0231219 | A1 | * | 9/2008  | Mori et al. ..................... 318/434 |
| 2008/0252242 | A1 | * | 10/2008 | Akama et al. ............. 318/400.14 |
| 2009/0174350 | A1 | * | 7/2009  | Kuroda et al. ............ 318/400.11 |
| 2009/0322266 | A1 | * | 12/2009 | Dahlberg et al. ........ 318/400.11 |

* cited by examiner

*Primary Examiner* — Walter Benson
*Assistant Examiner* — Gabriel Agared
(74) *Attorney, Agent, or Firm* — Winston Hsu; Scott Margo (57) ABSTRACT

A control method of a current limit of a DC motor includes generating a reference voltage according to a preset current limit value of a DC motor; comparing the reference voltage with the voltage drop of a power control switch which drives the DC motor to generate a compare result; and controlling the power delivered to the DC motor according to the compare result in order to limit the current of the DC motor.

50 Claims, 8 Drawing Sheets

CURRENT LIMIT CONTROL METHOD OF DC MOTOR AND RELATED DEVICE AND CIRCUIT

BACKGROUND OF THE INVENTION

1. Field of the Invention

The present invention is related to a current limit control method of DC motor and related device and motor control circuit, and more particularly, to a current limit control method of DC motor and related device and motor control circuit which can prevent the influence from the circuit components and the environmental factors and perform high degree of accuracy of measurement to the motor current.

2. Description of the Prior Art

A DC motor has very wide application in our everyday life. For example, a fan driven by the DC motor can be installed on a CPU chip to help dissipating heat of the corresponding personal computer. Also, inside every optical disk drive or hard disk drive, the DC motor is used to drive the optical disk or the hard disk. On the other hand, applications like robots and toys also use DC motors for various purposes. Generally speaking, the working principle of the DC brushless motor is to conduct a current through the stator coil of the DC motor to generate a magnetic field; the magnetic field generated by the stator is then interacted with the magnetic field of the rotor (armature), so the rotor can start rotating, and the DC motor can be considered as a device which converts electrical energy into mechanical torque.

The DC motor is usually accompanied with a controller which is use to control and drive the motor. Please refer to FIG. 1, which illustrates a schematic diagram of a DC motor circuit 10 according to the prior art. The DC motor circuit 10 comprises a power supply device PY1, power control switches PSW1~PSW4, a comparator COMP, a controller CNTL and a DC motor MOTOR. According to FIG. 1, the DC motor MOTOR is represented by an inductor, and OUTA1 and OUTB1 are the two endpoints of the motor MOTOR. Usually, the power control switches PSW1 and PSW3, which are connected between the power supply device PY1 and the DC motor MOTOR, are also called the upper gate switches; on the other hand, the power control switches PSW2 and PSW4, connected between the DC motor MOTOR and the ground end, are also called the lower gate switches. Besides that, the DC motor circuit 10 also comprises two bypass capacitors CVM1 and CVCC1 for stabilizing the power voltage level, and a detecting resistor RS1 is for detecting the motor current. Also, according to FIG. 1, the two endpoints of the detecting resistor RS1 are VCC1 and VM1, respectively, and by detecting the voltage drop between the two endpoints VCC1 and VM1 of the detecting resistor RS1, the magnitude of the motor current can be determined. On the other hand, the controller CNTL can limit the magnitude of the motor current by controlling the "ON" and "OFF" actions of the power control switches PSW1~PSW4. This is extremely important because, for certain circumstances, a large motor current could damage the circuit, the components and the motor itself.

Figure 1:
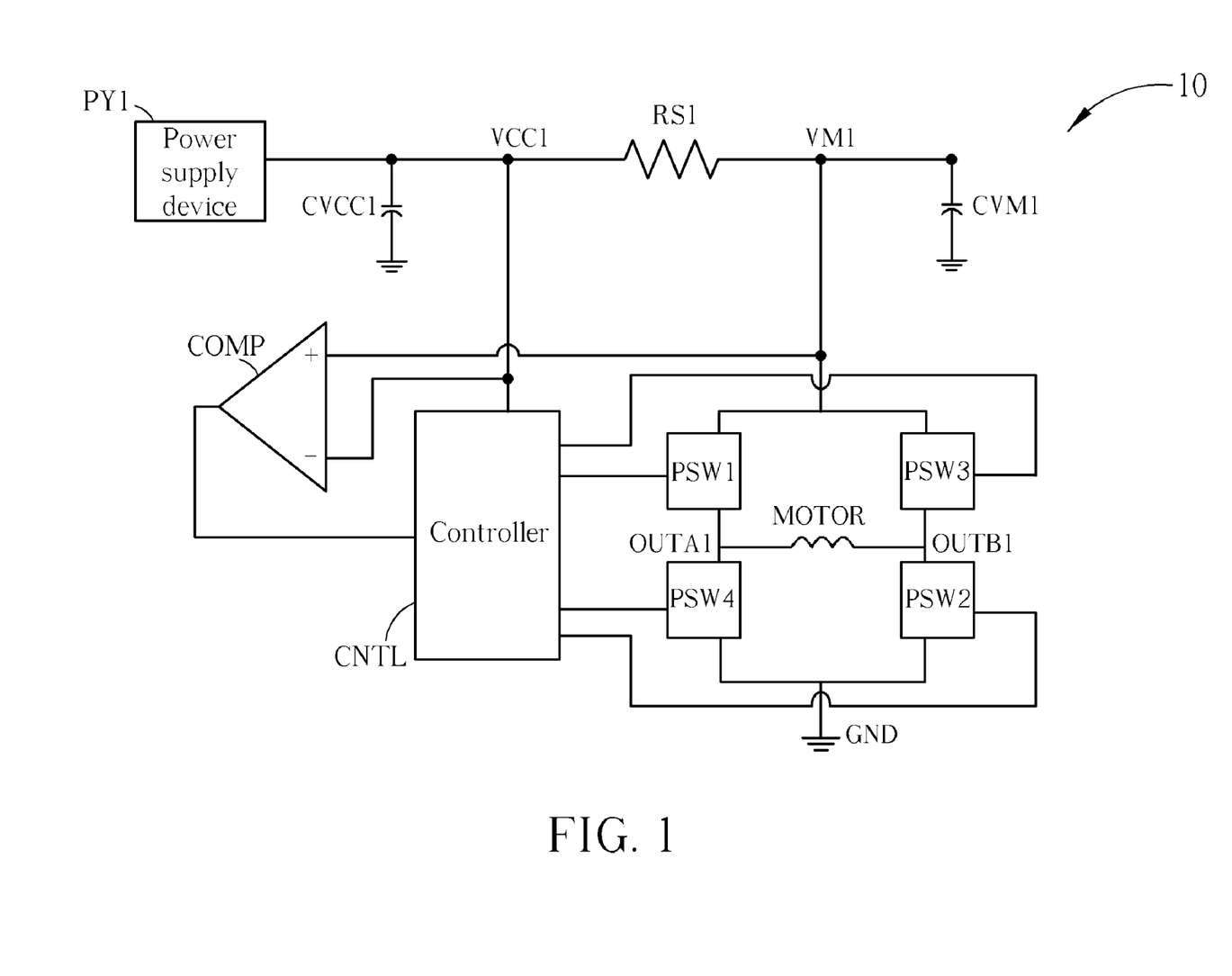
FIG. 1~FIG. 2 illustrate schematic diagrams of a DC motor circuit according to the prior art.

While in the state of normal operation, the motor can be operated by switching between two states: the first motor driving state and the second motor driving state. On the first motor driving state, the controller CNTL turns on the upper bridge switch PSW1 and the corresponding lower gate switch PSW2, such that a current can be conducted from the power supply device PY1, through the power control switch PSW1 to the DC motor MOTOR; after that, the current is then directed through the power control switch PSW2 to the ground, such that the energy can be transferred from the power supply device PY1 to the DC motor MOTOR. On the second motor driving state, the controller CNTL can turn on the upper bridge switch PSW3 and the corresponding lower gate switch PSW4, and the current is conducted from the power supply device PY1, through the power control switch PSW3 to the DC motor MOTOR, and then through the power control switch PSW4, and directed to the ground, and the energy can also be transferred to the DC motor MOTOR. By switching between the first motor driving state and the second motor driving state, the controller CNTL can keep the motor running (please note that the above description gives an example for single-phase motor type only, the operations of multiple phase motor can also be derived by analogy). However, if the magnitude of the current flowing through the DC motor MOTOR is greater than a current limit value ILIM1 (which is determined by the designer according to the functional characteristics or the electrical maximum-rating of device of motor or other related components) it is possible that the motor circuit will be damaged by the current; to prevent this to be happened, a detecting circuit is required to constantly detect the magnitude of the motor current, and then the controller CNTL can temporarily shut down the current (energy) supply path from the power supply device PY1 to the DC motor MOTOR, by temporarily turning off the upper gate switch PSW1 (corresponding to the first motor driving state) or PSW3 (corresponding to the second motor driving state) when the motor current surpasses a current limit value ILIM1, so the motor current can be controlled under the current limit value ILIM1.

Please continue to refer to FIG. 1. Inside the figure, the comparator COMP detects the voltage difference across the ends of the detecting resistor RS1 to indirectly measure the magnitude of the current flowing through the DC motor MOTOR. However, the DC motor circuit 10 has several drawbacks. First, the detecting resistor RS1 in the DC motor circuit 10 must be a high-power precision resistor, and the cost is high. Next, when the upper gate switch PSW1 or PSW3 turns on (or turns off), for a short moment, the bypass capacitors CVM and CVCC, which were originally used for power voltage stabilization, can provide a current pulse to the DC motor MOTOR, such that the current flowing through the DC motor may be very different from the current flowing through the detecting resistor RS1. In other words, when the upper gate switch PSW1 or PSW3 just turns on (or turns off), the current flowing through the DC motor MOTOR may include both the current from the capacitor CVM and the current flowing through the detecting resistor RS1; therefore, for example, at the moment when switch PSW1 or PSW3 just turns on (or turns off), if the measurement of the current flowing through the detecting resistor has shown that it is 1.0 Amp, the current flowing through the DC motor MOTOR might actually be about 1.5 Amp or even larger. Besides that, since the function of capacitor CVM is mainly for voltage stabilization, very often the capacitance of the capacitor CVM is large, therefore when the upper gate switch PSW1 or PSW3 is turned on, the capacitor can provide a current pulse of considerable magnitude to interfere the correct measurement of the real motor current. Also, the current flowing through the DC motor MOTOR mostly flows through the detecting resistor RS1, and thus converts plenty of electric power into thermal heat. On the other hand, if a resistor of smaller resistance is used for the detecting resistor RS1, the voltage drop across the detecting resistor RS1 will definitely become smaller; this will make the measurement of the current even more difficult and the accuracy becomes poorer. In this case, if the same degree of accuracy is to be achieved, the highly sensitive comparator COMP should be selected and/or some extra supporting circuitry should be added. Just for the same reason, only a few off-the-shelf resistors are proper to be utilized as the detecting resistor RS1, and many limitations are still restricting the operating range of the motor current and the precision of measurement.

Figure 2:
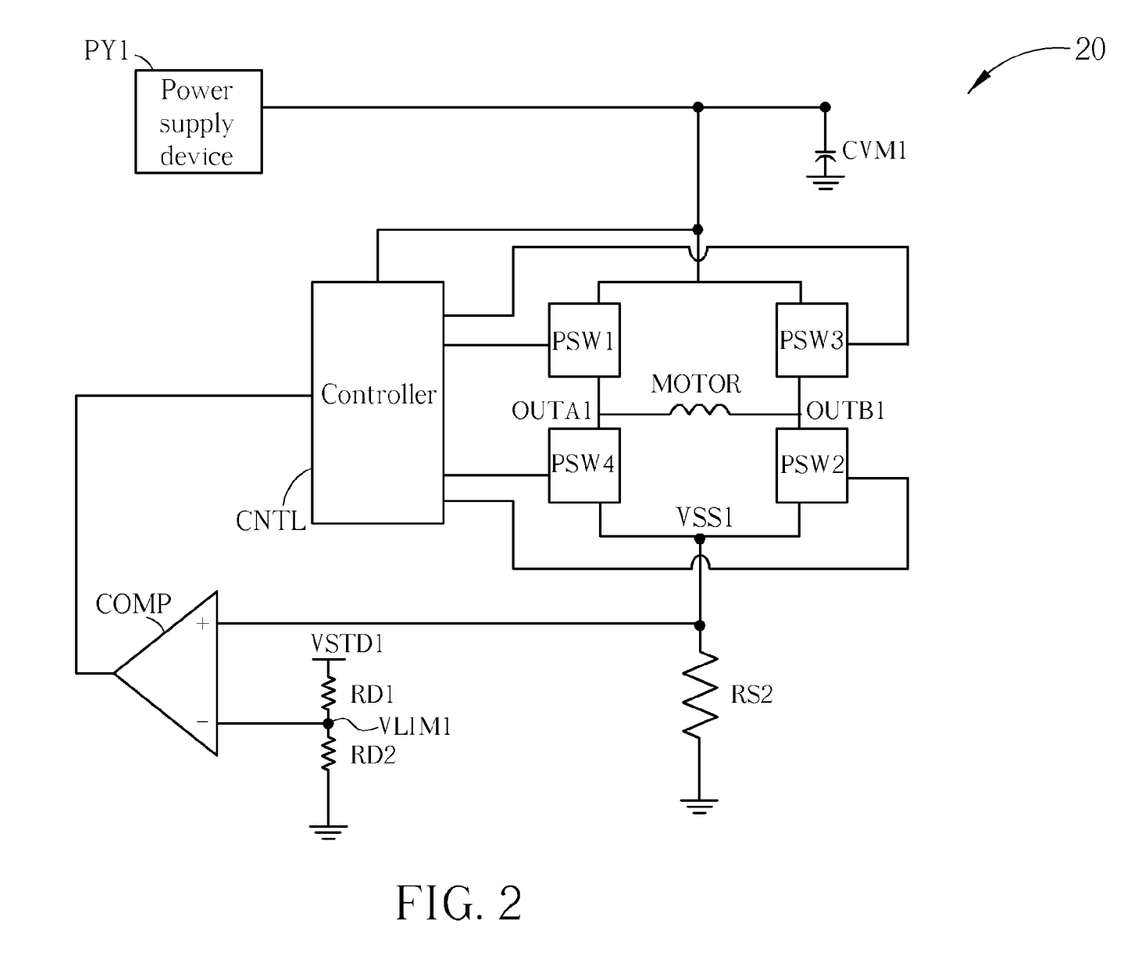

Please refer to FIG. 2, which illustrates a schematic diagram of another DC motor circuit 20 according to the prior art. The DC motor circuit 20 is similar to the DC motor circuit 10 in many ways, and the components of the same function are using the same symbols for easy comparison. The DC motor circuit 20 utilizes a detecting resistor RS2, resistors RD1 and RD2, and a comparator COMP to detect the magnitude of the current flowing through the DC motor, and there is a controller 204 being used to control the DC motor MOTOR. By carefully examining the differences between the DC motor circuit 20 and the DC motor circuit 10, it can be observed that the detecting resistor RS2 for detecting the motor current is now placed between the lower gate switches (PSW2 and PSW4) and the ground end, instead of being placed close to the power supply device PY1. Owing to this major difference, the current flowing through the DC motor MOTOR will all flow to the ground through the detecting resistor RS2, and the DC motor circuit 20 can then detect the voltage drop between the ends of the detecting resistor RS2 to determine the magnitude of the magnitude of the motor current. On the other hand, connected to the negative end of the comparator COMP is a reference voltage VLIM1, which is output by the circuit composed of a voltage source VSTD1, and two resistors RD1 and RD2 as the voltage divider. By utilizing the comparator COMP to compare the voltage of an endpoint VSS1 with the reference voltage VLIM1, when the voltage VSS1 is greater than the reference voltage VLIM1, the comparator COMP will switch its output state and notify the controller 204 to turn off the upper gate switch PSW1 or PSW3 (depends on whether the DC motor circuit 20 is on the first motor driving state or the second motor driving state), such that the motor current and the rotational speed of the motor can be under control.

Inside the DC motor circuit 20, by placing the detecting resistor RS2 between the DC motor MOTOR and the ground end, the bypass capacitor can no longer interfere with the measurement of the motor current. However, the detecting resistor still has to be a high-power precision resistor, and the cost is still high, and plenty of electric power can still be wasted. Next, similar to the situations of the DC motor circuit 10, if a resistor of less resistance is being used for the detecting resistor RS2, even though less power will be wasted, but the voltage drop between the two ends of the detecting resistor RS2 will become too small to detect nice and easy, some more accessory circuit should be added to properly increase the precision of the measurement. Because of this, the range of the current limit will become very limited and the degree of precision of the motor current measurement is reduced. For example, if the resistance of the detecting resistor RS2 is 0.5Ω, and value of the current limit is set at 0.5 Amp, then the resistors RD1 and RD2 can be selected such that the reference voltage VLIM1 can be equal to 0.25 Volt (=0.5Ω*0.5 Amp). When the voltage drop between the two ends of the detecting resistor RS2 becomes equal to or greater than 0.25 Volt, the comparator COMP will switch its output state (by switching its output voltage), and turns off the upper gate switch PSW1 or PSW3 via the controller 204 to limit the motor current. On the other hand, if the current limit is increased to 1.0 Amp, the comparator COMP will change its output state when the voltage drop between the two ends of the detecting resistor RS2 becomes equal to or greater than 0.5 Volt. For the example above, when the current limit is increased from 0.5 Amp to 1.0 Amp, the voltage drop between the two ends of the detecting resistor RS2 will only slightly increase from 0.25 Volt to 0.5 Volt, as can been seen, the variation of voltage drop is small even though motor current had been doubled, so such method will still be improper for high precision measurement. To make a short summary, inside the DC motor circuit 20, because the resistance of the detecting resistor RS2 has to be a high-power precision resistor of very small resistance, when the value of the current limit changes, this requires the comparator COMP to be sensitive enough to detect the slight difference between the two ends of the detecting resistor RS2. And, the performance requirements of the comparator are pretty high and the cost of the component is relatively high.

However, differing from the lower gate switches PSW2 and PSW4, which are built in an integrated circuit (IC), the detecting resistor RS2 is often placed on a printed circuit board next to the integrated circuit, so the current limit can be adjusted more conveniently by different users or functions; unfortunately, a parasitic inductor can be introduced between the lower gate switches (PSW2 and/or PSW4) and the ground end. When the upper gate switch PSW1 or PSW3 suddenly turns on or off, this parasitic inductor can produce a voltage pulse on the end of the detecting resistor RS2, such that the comparator COMP can make wrong judgment. For example, when operated in the first motor driving state, the current is going from the power supply device PY1, through the power control switch PSW1 to drive the DC motor MOTOR, and then passing through the power control switch PSW2, and directed to the ground after passing the detecting resistor RS2. But, when the upper gate switch PSW1 suddenly turns off, because the motor current needs to keep its continuity (due to motor has inductance character, so the current still needs to go from the endpoint OUTA1, through the DC motor MOTOR, and to the endpoint OUTB1), a conducting loop was formed by having the current passing through the two lower gate switches PSW2 and PSW4, such that the motor current won't be stopped. Meanwhile, since the two lower gate switches formed a conducting current loop, the motor current will no longer flow to the ground GND. Noteworthily, even if the lower gate switch PSW4 is in an "OFF" state (being turned off by the controller 204), a current can still be conducted from the source of the lower gate switch PSW4, to the endpoint OUTB1 via the body diode of the lower gate switch PSW4, and the conducting loop can still be established. However, changing the path of the motor current will bring an abrupt change to the magnitude of the current flowing through the parasitic inductor. According to the operating principles of the inductor, when the current of the inductor experiences a sudden change, the voltage across the inductor will display a large voltage pulse. Therefore, when the parasitic inductor between the lower gate switches PSW2, PSW4 and the detecting resistor RS2 suddenly loses its current, across the ends of the parasitic inductor, a large voltage pulse will be generated, and the comparator COMP will make wrong judgment. To avoid this, the DC motor circuit 20 needs some extra circuit to avoid the misjudgment. Besides that, when the power control switches were turned on, the power control switches can be observed as an ideal resistor of a small resistance, and the resistance is inversely proportional to the "ON" voltage of the power control switch. In other words, the resistance of the power control switch is inversely proportional to the voltage difference between the gate and the source of the power control switch. Since there is a voltage drop across the ends of the detecting resistor RS2, the "ON" voltage will be lowered than the desired value, such that the resistance of a conducting power control switches PSW1~PSW4 will be increased, and the conductivity of the power control switches PSW1~PSW4 will be decreased; meanwhile, the power consumption will be increased, and the power efficiency will be decreased.

SUMMARY OF THE INVENTION

It is therefore a primary objective of the claimed invention to provide a current limit control method of DC motor and related device and motor control circuit to avoid drawbacks of the prior art.

The present invention discloses a control method of a current limit of a DC motor, which comprises generating a reference voltage according to a preset current limit value of a DC motor; comparing the reference voltage with the voltage drop of a power control switch which drives the DC motor to generate a compare result; and controlling the power delivered to the DC motor according to the compare result in order to limit the current of the DC motor.

The present invention further discloses a current limit device for controlling a DC motor which comprises a reference voltage generating unit, for generating a reference voltage according to a preset current limit value of a DC motor; a comparing unit, for comparing the reference voltage with the voltage drop of a power control switch which drives the DC motor to generate a compare result; and a control unit, for controlling the power delivered to the DC motor in order to limit the current of the DC motor according to the compare result.

The present invention further discloses a motor control circuit for controlling a DC motor, for conducting current between a first end and a second end of the DC motor to generate kinetic energy, and the motor control circuit comprises a power supply device, for supplying a DC power; a plurality of power control switches, each comprising a first end, a second end and a third end, for controlling the signal connections between the first end and the third end, according to a signal of the second end; a plurality of output ends, each coupled to a second end of a power control switch, for controlling the current conduction of the power control switch; a first input end, coupled to the first end of the DC motor; a second end, coupled to the second end of the DC motor; and a current limit device, which comprises a reference voltage generating unit, for generating a reference voltage according to a preset current limit value of a DC motor; a comparing unit, coupled to the reference voltage generating unit, the first input end and the second input end, for selecting an input end between the first input end and the second input end, and comparing the voltage of the selected input end with the reference voltage to generate a compare result according to the direction of the motor current; and a control unit, coupled to the comparing unit, for controlling the power delivered to the DC motor according to the compare result, in order to limit the current of the DC motor.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
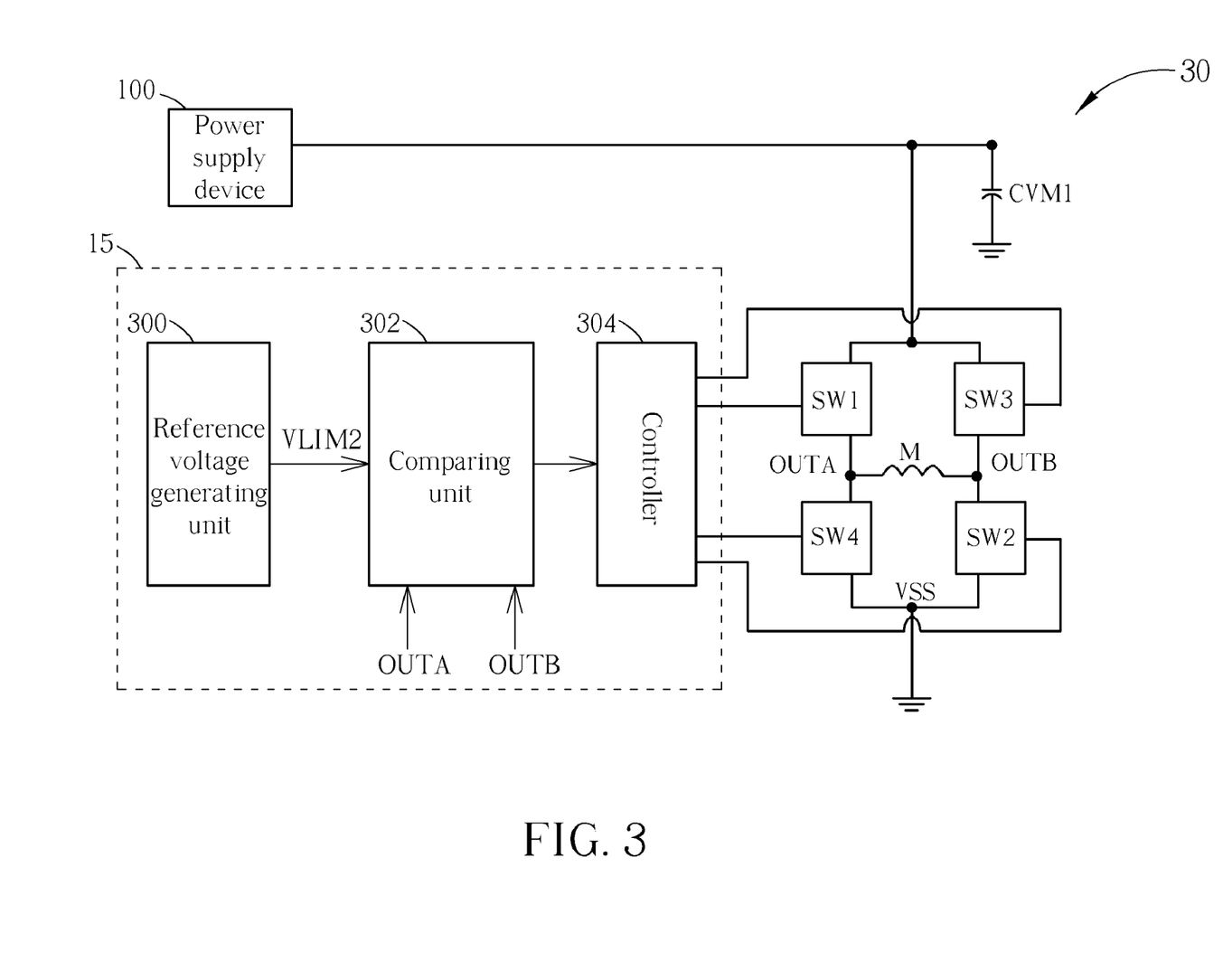
FIG. 3 illustrates a schematic diagram of a motor control circuit according to an embodiment of the present invention.

Please refer to FIG. 3, which illustrates a schematic diagram of a motor control circuit 30 according to an embodiment of the present invention. The motor control circuit 30 is utilized for controlling a DC motor M, and comprises a power supply device 100, power control switches SW1~SW4, a bypass capacitor CVM and current limit device 15. Besides, the current limit device 15 further comprises a reference voltage generating unit 300, a comparing unit 302 and a control unit 304. According to the purpose of the present invention, the motor control circuit 30 is used for detecting and controlling the DC motor current by an effective and power-saving method disclosed in the present invention.

Figure 4:
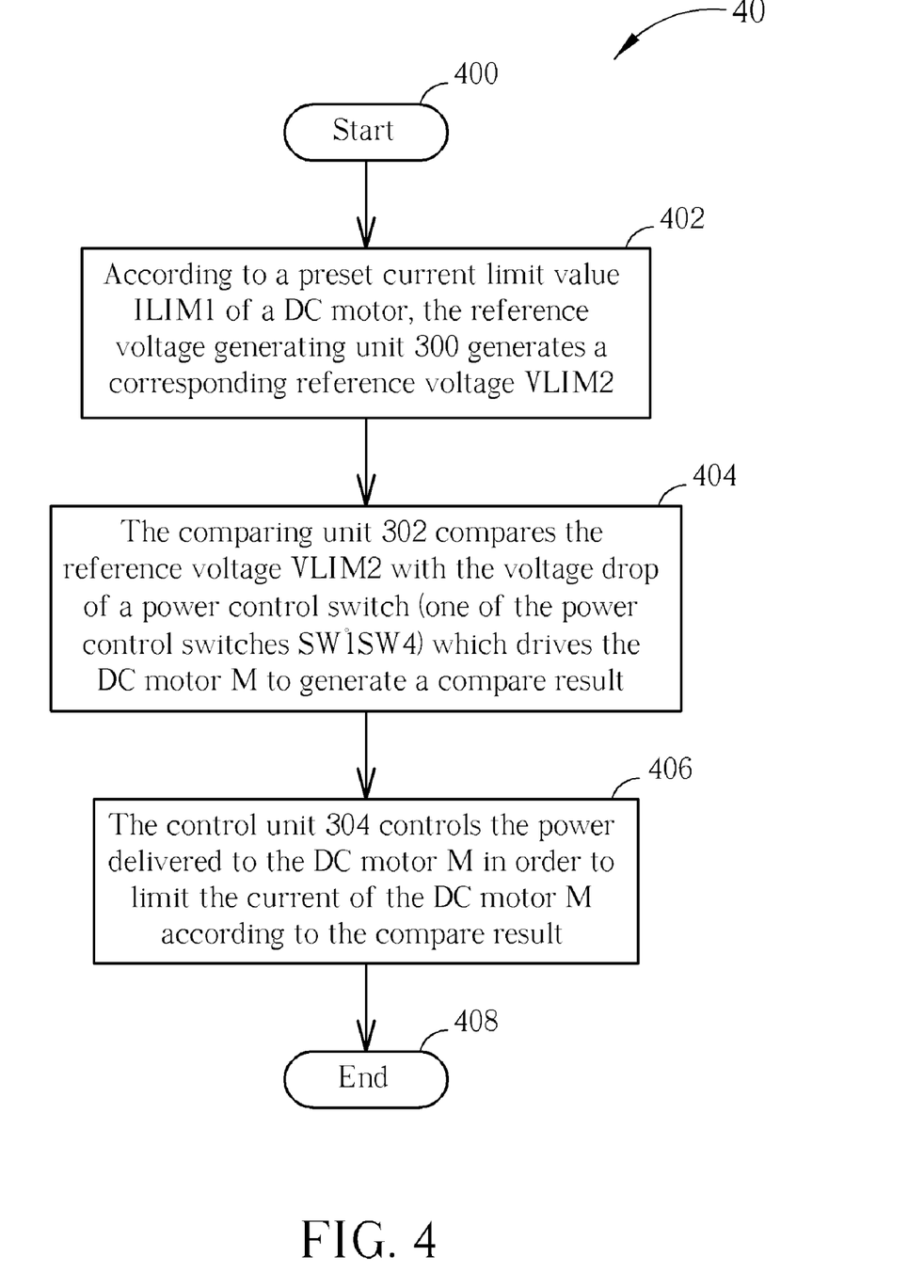
FIG. 4 illustrates a process according to an embodiment of the present invention.

Please refer to FIG. 4, which illustrates a process 40 according to an embodiment of the present invention. The process 40 is used by the current limit device 15 to control the current of the DC motor M. The process 40 includes the following steps:

STEP 400: Start.

STEP 402: According to a preset current limit value ILIM1 of a DC motor, the reference voltage generating unit 300 generates a corresponding reference voltage VLIM2.

STEP 404: The comparing unit 302 compares the reference voltage VLIM2 with the voltage drop of a power control switch (one of the power control switches SW1~SW4) which drives the DC motor M to generate a compare result.

STEP 406: The control unit 304 controls the power delivered to the DC motor M in order to limit the current of the DC motor M according to the compare result.

STEP 408: End.

According to the process 40, to perform the current limit control of the DC motor M will start with generating a reference voltage VLIM2 by the reference voltage generating unit 300 according to a preset current limit value ILIM1 of a DC motor M. Then, utilize the comparing unit 302 to compare the reference voltage VLIM2 with the voltage drop of a power control switch (one of the power control switches SW1~SW4) which drives the DC motor M, and to generate a compare result, such that the control unit 304 can control the power delivered to the DC motor M in order to limit the current of the DC motor M according to the compare result. Inside it, the preset current ILIM1 represents the current limit the motor M, and the user can set a value for ILIM1 by considering the characteristics of the motor M, and the current endurance (electrical maximum rating) of the components; besides, preferably, the user can go further to save energy by setting the current limit to a lower level.

Noteworthily, the rationale of the present invention to use the terminal voltage of a power control switch to determine the motor current is because the terminal voltage of the power control switch can perfectly reflect the magnitude of the motor current, and won't be affected by some external sources of interference to reduce the accuracy of the measurement. For example, when the motor is operated in the first motor driving state, the power control switches SW1 and SW4 will be turned on or off alternatively, but the power control switch SW2 is constantly on, and the power control switch SW3 is constantly off. The direction of the motor current is from the endpoint OUTA to the endpoint OUTB, and flowing to the ground end by way of the power control switch SW2. Since the power control switch SW2 is constantly on, the motor current will pass through the power control switch SW2 and then to the ground without any interruption. And, by taking the conducting resistance of the power control switch SW2 to be multiplied with the value of the motor current, the result will be the voltage drop between the endpoint OUTB and the ground. Therefore, when the motor current changes its magnitude, the voltage of the endpoint OUTB will change accordingly, and to detect the changing value of the voltage of the endpoint OUTB will be equivalent to detecting the changing value of the motor current. Therefore, the present invention measures the magnitude of the motor current by detecting the voltage of the endpoint OUTB on the first motor driving state. Besides that, the switch SW2 will not turn on or off to interfere with the measurement, and all the current flowing through motor M will totally flowing through the power control switch SW2, and so detecting the magnitude of the motor current by detecting the voltage of the endpoint OUTB can keep any extraneous interference from reducing the accuracy of the measurement. Compared with the prior art, the present invention can avoid the interferences such as the current provided by the bypass capacitor or the voltage pulse generated by the parasitic inductor. Similarly, when the motor is operated in the second motor driving state, the power control switches SW2 and SW3 will be turned on or off alternatively, but the power control switch SW4 is turned on and fixed, and the power control switch SW1 is turned off and fixed. The present invention then detects the magnitude of the motor current by detecting the voltage of the endpoint OUTA. To make a brief summary, the motor switches between the first motor driving state and the second motor driving state to keep the motor rotating, and the present invention measures the voltage of the endpoints OUTA or OUTB to precisely and effectively determine the magnitude of the motor current, such that the design objective of controlling the current limit can be achieved. On the other hand, please notice that FIG. 3 is merely used for illustrating an embodiment of the present invention and those people of common knowledge in the art will readily observe that numerous alterations can be made to achieve those steps in the process 40.

As stated above, the present invention is to detect the terminal voltage of the power control switch to measure the instantaneous magnitude of the current (owing to the fact that the terminal voltage of the power control switch is equal to the conducting resistance of power control switch multiplied by the magnitude of the motor current). However, by considering ways of realization, there still exists several design factors which needs to be fixed. For example, the process factors of the IC manufacturing process can be drifted wafer by wafer, the temperature can be changed while operating, and the "ON" voltage of the power control switches (normally the "ON" voltage is equal to the power voltage) can be changed, too; therefore, the conducting resistance of the power control switch can then be changed. And, if the conducting resistance of power control switch cannot be tracked properly, the measurement will be inaccurate. Therefore, the designer must let the reference voltage VLIM2 be able to track the change in the conducting resistance of the power control switch owing to various factors, like the one stated above; in other words, when the variation of the conducting resistance of the power control switch is +10%, then the variation of the reference voltage VLIM2 must be as close to +10% as possible. If this design objective can be achieved, the accuracy of the measurement can be freed from being affected by some environmental factors and generating inaccurate measurement result. About the method and device for the synchronous tracking function between the reference voltage VLIM2 and the conducting resistance of the power control switch, please read the following specifications.

Figure 5A:
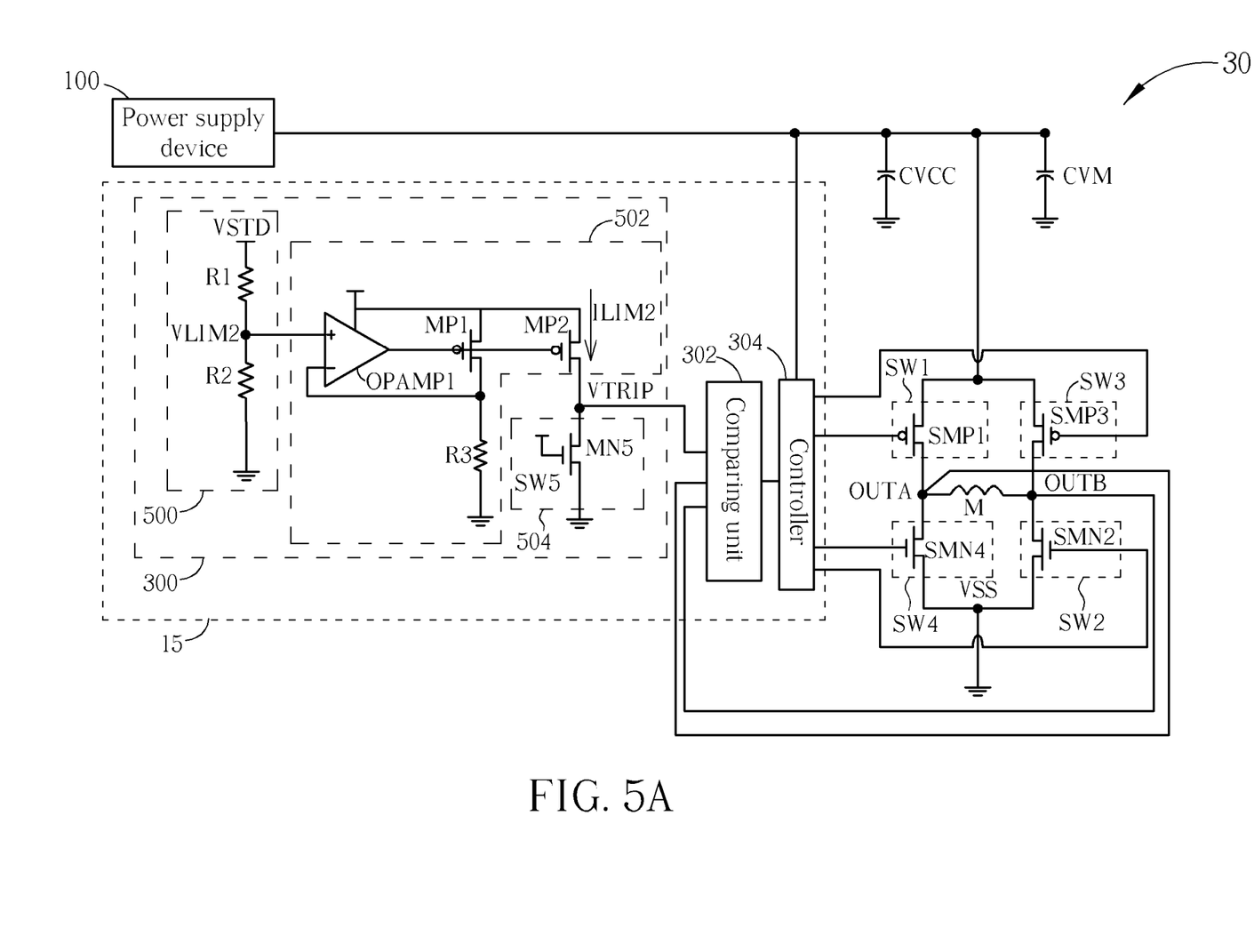
FIG. 5A~FIG. 5D illustrate a motor control circuit according to an alternative embodiment of the present invention.

Please refer to FIG. 5A, which illustrates a motor control circuit 300 according to an alternative embodiment of the present invention. Inside FIG. 5A, the reference voltage generating unit 300 is composed of a voltage generating unit 500, a voltage to current conversion unit 502 and a simulation switch unit 504. First, let the preset current limit ILIM1 of the motor M be represented as a voltage VLIM2. Next, convert the voltage VLIM2 to a current ITRIP by using the voltage to current conversion unit 502, and then multiply the value of the current ITRIP with the resistance value of the simulation switch unit 504 to get the reference voltage VTRIP. Inside, the transistor included in the simulation switch unit 504 is of the same type with the power control switch; for example, they are all n-type MOSFETs, or are all p-type MOSFETs, or are all PNP bipolar junction transistors, or are all NPN bipolar junction transistors, and the transistors of the same type are manufactured in the same integrated circuit manufacturing process. Also, owing to the same manufacturing process, the functional characteristics will respond to the environmental change in a synchronous manner. Therefore, the reference voltage generating unit 300 can track the variations of the conducting resistance of the power control switch by using the transistor which is of the same transistor type in the simulation switch unit 504, and the magnitude of the motor current can be detected without being influenced by the factors like IC manufacturing process, temperature or the "ON" voltage of the power control switch. On the other hand, the voltage generating unit 500 composed of voltage dividing resistors R1 and R2, which by combining with a voltage source VSTD, can be used to generate a voltage VLIM2 proportional to the preset current ILIM1, and can be used by the user to adjust the value of voltage VLIM2, so it can correspond to different values of the limit current ILIM1 of the motor. The voltage to current conversion unit 502 comprises an operational amplifier OPAMP1, a resistor R3 and two p-type MOSFETs MP1 and MP2 to constitute a current mirror circuit, and the voltage to current conversion unit 502 is to convert the voltage VLIM2 into a current ILIM2, whose magnitude is proportional to the voltage level of VLIM2.

Noteworthily, the present invention enforces the magnitude of the current ILIM2 to be RATIO times smaller than the magnitude of the current ILIM1. Meanwhile, if the conducting resistance of the simulation switch unit 504 is designed to be RATIO times greater than the conducting resistance of the power control switch, then the voltage VTRIP, which is equal to the magnitude of the current ILIM2 multiplied by the conducting resistance of the simulation switch unit 504, will be equal to the magnitude of the current ILIM1 multiplied by the conducting resistance of the power control switch. In other words, the present invention presets a reference voltage VTRIP, and by multiplying the magnitude of the motor current with the conducting resistance of the power control switch will get a voltage value (which is equal to the terminal voltage of the power control switch), and when the voltage value equals to voltage VTRIP, it represents the magnitude of the motor current is equal to the current limit ILIM1 preset by the designer, and the circuit can be utilized to detect and limit the motor current. Besides that, the design of the power control switch usually takes up large chip area in order to reduce the conducting resistance and the power consumption. For example, if the preset value RATIO is 100, then the chip area taken up by the transistor in the simulation switch unit 504 will only amount to 1% of the chip area taken up by the power control switch, and the cost is low. Meanwhile, the magnitude of the current ILIM2 also amounts to 1% of the magnitude of the current ILIM1, and the power consumption is also very small. Besides, the preset value RATIO can be chosen to be an even larger value, e.g. 1000, to further reduce the power consumption and the chip area. Besides that, if the proportion of the WL ratio of the transistors MP1 and MP2 of the current mirror circuit is designed to be 1:1, then the currents through the transistors MP1 and MP2 will be equal, and the designer can adjust the resistance of the resistor R3 to get a desired magnitude for the current ILIM2 (the value of the current ILIM2 is equal to the voltage level of VLIM2 divided by the resistance of resistor R3). And, if the proportion of the WL ratio of the transistors MP1 and MP2 is designed to be K:1, then the current through the transistor MP1 will be K times the current through the transistor MP2 (which is the current ILIM2), then the resistance of the resistor R3 must be smaller by K times to get the same magnitude of current for ILIM2. Also, since the resistance of the resistor R3 is smaller than the original one by K times, the chip area for the resistor R3 can be smaller, and the cost can be reduced. On the contrary, if the proportion of the WL ratio of the transistors MP1 and MP2 is designed to be 1:K, then the current through the transistor MP2 (the current ILIM2) will be K times the current through the transistor MP1. In this case, the resistance of the resistor R3 will be K times larger than the original to get the same magnitude of the current ILIM2, and the current through the transistor MP1 will be K times smaller than the current through the transistor MP2 (ILIM2). Therefore, in this case, the magnitude of the current of the transistors MP1 can be reduced to get the benefits of less power consumption. According to the design options stated above, a designer can then acknowledge and apply the circuit architecture disclosed in the present invention, and select proper design parameters based on the cost, the power consumption, and some other design factors. In short, by multiplying the conducting resistance of simulation switch unit 504 (the proportion of the resistance of the simulation switch unit 504 relative to the power control switch is RATIO:1), and the current ILIM2 (the proportion of the current ILIM2 relative to the current limit is 1:RATIO), the resulting reference voltage VTRIP can then be used to accurately detect the motor current. On the other hand, since the upper gate switches SW1 and SW3 in FIG. 5A are made of the p-type MOSFETs SMP1 and SMP3, respectively, and the lower gate switches SW2 and SW4 are made of the n-type MOSFETs SMN2 and SMN4. Therefore, as depicted in the FIG. 5A, the transistor in the simulation switch unit 504 can be realized by the n-type MOSFET MN5.

Noteworthily, the voltage connected to the gate of the n-type MOSFET MN5 is identical to the voltage connected to the gates of a working power control switch, and the transistors are all turned on; when the voltage level of the power supply changes, the conducting resistance of both the MOSFET MN5 and the power control switch will change synchronously, and so the MOSFET MN5 and the power control switch can track each other's resistance value. On the other hand, the proportion of the MOSFET MN5 relative to the power control switch can be realized by changing the WL ratio of the transistor. Specifically, the WL ratio of the MOSFETs SMN2 and SMN4 divided by the preset value RATIO will be the WL ratio of the transistor MN5. As a result, the conducting resistance of the transistor MN5 will be equal to the conducting resistance of the transistors SMN2 and SMN4 multiplied by the preset value RATIO. As stated above, the magnitude of the current ILIM2 will be equal to the magnitude of the preset current ILIM1 divided by the preset value RATIO.

Briefly speaking, the present invention utilizes a miniaturized transistor MN5 with device area reduced by RATIO times (compared with power control switch), and lets the transistor operate at the on state When the resistance of transistor MN5 which is RATIO times greater, multiplied with the current ILIM2 which is RATIO times smaller, a reference voltage VTRIP corresponding to the preset current ILIM1 can also be acquired. For example, if the value of the preset current ILIM1 is 0.1 A, and the preset value RATIO is 100, then the conducting resistance of the transistor MN5 must be 100 times larger than the conducting resistance of the transistor SMN2 or SMN4, and the magnitude of current ILIM2 must be set to be 1 mA, which is 100 times smaller than the preset current ILIM1. To meet this specification, the WL ratio of the transistors SMN2 and SMN4 must be 100 times larger than the WL ratio of the transistor MN5. Besides, to produce a current which is 100 times smaller than the preset current ILIM1, the operational amplifier OPAMP1, resistor R3 and p-type MOSFETs MP1 and MP2 are utilized to perform the function, and the designer can select proper combinations of the values of the voltage source VSTD, and the resistors R1 and R2 to generate the required voltage VLIM2. For example, to make the voltage VLIM2=1.0V, a combination of voltage VSTD=5.0V, resistor R1=4.0 KΩ and R2=1.0 KΩ can be used, and so on. If the proportion of WL ratios of transistors MP1 and MP2 is 1:1, then the value of resistor R3 can be acquired by finding the quotient which is equal to dividing the value of the voltage VLIM2 by the value of the current ILIM2, and in this case, the quotient will be 1.0 KΩ (=1.0V÷1 mA). As a result, when the magnitude of the motor current is equal to or greater than 0.1 A, the resulting voltage drop across the transistors SMN2 or SMN4 will be equal to or greater than the voltage VTRIP (which is also equal to the value of current ILIM2 multiplied by the conducting resistance of the transistor MN5). Altogether, by utilizing the comparing unit 302, the circuit can compare the voltage of the endpoint OUTA or OUTB with the reference voltage VTRIP (the voltage of endpoint OUTA will be equal to the voltage drop across transistor SMN4, and the voltage of endpoint OUTB will be equal to the voltage drop across transistor SMN2), and transfer the compare result to the control unit 304 to perform control actions to the power control switches; if the magnitude of the motor current surpasses the current limit, the transistor SMP1 (corresponding to the first motor driving state) or SMP3 (corresponding to the second motor driving state) will be turned off to limit the motor current.

On the other hand, while implementing the physical circuit, preferably, the voltage generating unit 500 which is used to generate the voltage VLIM2 can be separated from the voltage to current conversion unit 502 and simulation switch unit 504. In other words, the voltage to current conversion unit 502 and the simulation switch unit 504 can both be realized in an integrated circuit, while the voltage source VSTD, and the voltage dividing resistors R1 and R2 of the voltage generating unit 500 can be placed outside of the integrated circuit. Therefore, the limit current value of the motor current can be adjusted more easily by user. On the other hand, since the resistors R1 and R2 are utilized with the voltage source VSTD to constitute a proportional relationship to get a voltage division value, so the resistors R1 and R2 can cancel the inherent nonlinear effects of each other, and so the resistors R1 and R2 can be ordinary resistors of less precision, and the cost can be reduced. On the other hand, other types of circuit for generating the variable voltage VLIM2 are possible and should be well known to the people in the art, and won't be detailed further.

According to the embodiment of the present invention in FIG. 5A, the motor control circuit 30 has the following features:

FEATURE 1: The motor control circuit 30 requires no high power precision resistor. In other words, the resistors R1, R2 used in the motor control circuit 30 can be low power (high resistance value) and of ordinary quality, and the component price is relatively low. Due to two reasons first, there are no large current flows through the resistors R1, R2, Second, they are used for voltage dividing, so the resulting voltage VLIM2 won't be affected by the individual characteristics of the resistors R1, R2, and won't affect the precision of the motor control circuit 30 as a whole. Meanwhile, the user can utilize different combinations of the resistors R1 and R2 to set the voltage VLIM2 to an arbitrary value between 0 volt and the voltage level of the source VSTD, such that the current limit value of the motor can be adjusted inside a much wider range compared with the prior art (i.e. the resolution is much better than that of the prior art).

FEATURE 2: Compared with the high-power precision resistors RS1, RS2, the resistors R1, R2 used in the present invention can be resistors of much larger resistance, and may consume much less power. Besides, the resistance of the resistor R3 can be much greater than the resistance of the detecting resistor (RS1 or RS2) used in the prior art, and therefore consumes far less power than the prior art.

FEATURE 3: In motor control circuit 30, the current detected is a good replica of the motor current, and there is no other circuit components can impose considerable interference on the current measurement, such as the current supplied by the bypass capacitor CVM. Also, the transistors MN4, SMN2 or SMN4 are being manufactured in the same silicon wafer, and their gates are all connected to the same voltage source, and operated in the same temperature. Therefore, the temperature, the process and the "ON" voltages of all the power control switches can be changed synchronously, such that some non-ideal effects can be cancelled and won't affect the measurement result. In other words, the motor control circuit 30 is less vulnerable to the factors like the fluctuations in temperature, the variations in manufacturing process, and the difference in the "ON" voltages of the power control switches.

FEATURE 4: In the motor control circuit 30, when the upper gate switch transistor SMP1 (or SMP3) are switching, the current flowing through the detecting point OUTB (or OUTA) in the endpoints of the motor can be displayed as a continuous function of time (the current won't change abruptly with discontinuities), so the accuracy of the measurement won't be affected by the voltage pulse as described in a circuit introduced in the prior art. To detail further, as stated above, when the motor is operated in the first motor driving state (in the first motor driving state, the switches SW1 and SW4 can be switched on and off alternatively, the switch SW2 is switched on and fixed, and the switch SW3 is switched off and fixed), the present invention will detect the voltage of the endpoint OUTB, and the endpoint OUTB won't "see" the switch SW2 to switch on or off during the first motor driving state, so the voltage measurement in endpoint OUTB won't be disturbed by any switching actions of the power control switches as in the prior art, and all the current which flows through the motor will also flow through the switch SW2. In other words, compared with the prior art, the present invention can avoid the interference such as the current provided by the bypass capacitor or the voltage pulse resulted from the parasitic inductor. The same situations can also be applied to the second motor driving state. Therefore, when the motor is operated in a normal state (switch between the first motor driving state and the second motor driving state alternatively), the present invention can accurately and effectively detect the motor current and perform the current limit functions.

FEATURE 5: As stated above, the detecting resistors (RS1 or RS2) of the prior art may exhibit a voltage drop which is too small to be effectively detected, so the resistance of the detecting resistors can't be too small. To solve this issue, some extra circuit components are required and the circuit (die) area will be increased. On the other hand, if the detecting resistors of larger resistance are being used, the power consumption will be increased. The present invention applies a circuit architecture which completely let out of the dilemma.

FEATURE 6: By applying the concept of miniature parameter, which is expressed as a preset value RATIO as above, the transistor MN5 can be designed to be a much small one, and only a tiny proportion of the chip area is taken, and the cost increased is minimal.

Figure 5B:
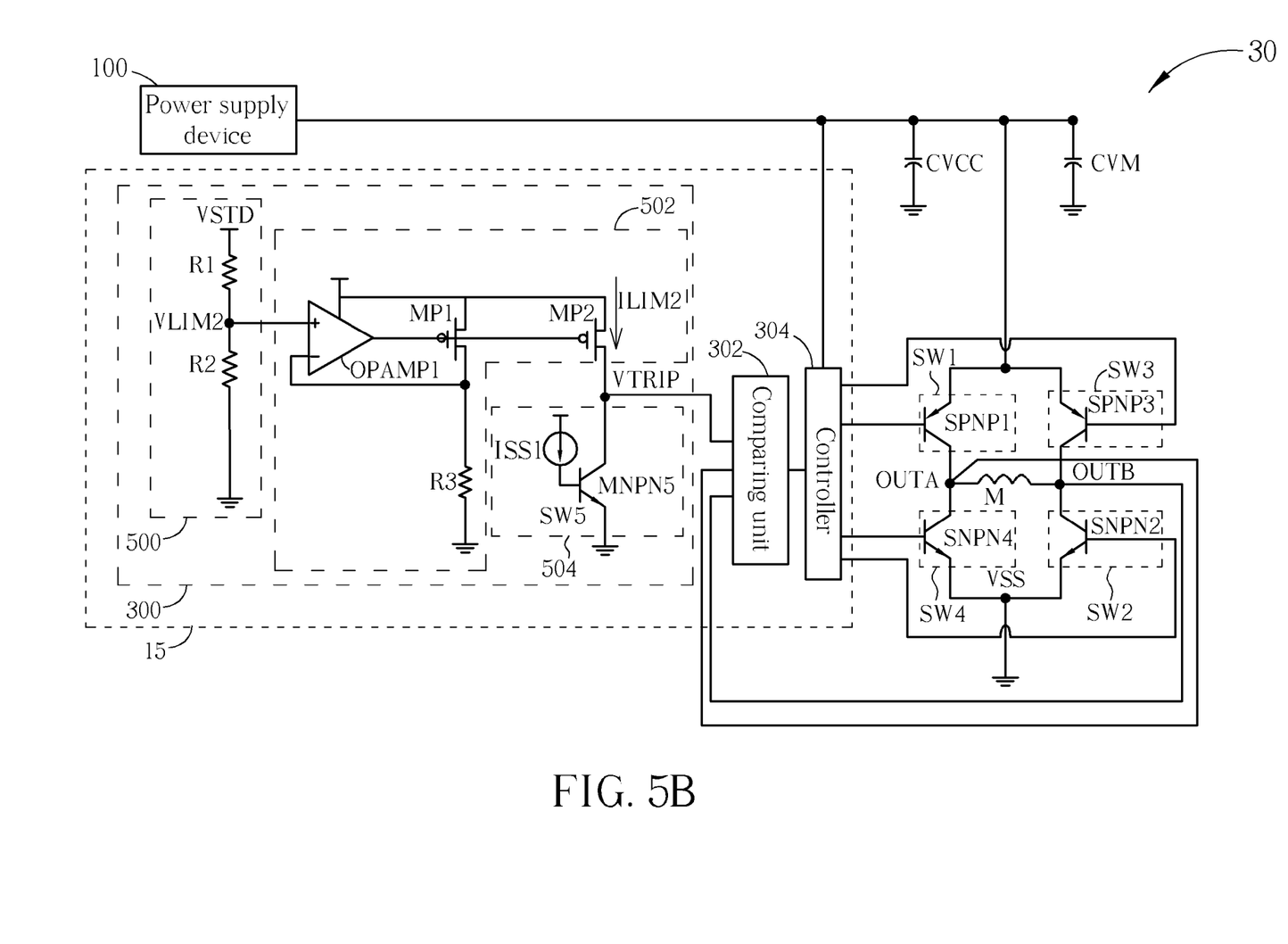

According to the experimental result, the motor control circuit 30 of the present invention outperforms the prior art in energy efficiency and measurement accuracy, and since the high power precision resistor and the high precision comparator both are waived for the present invention, the manufacturing cost can be greatly reduced. Noticeably, FIG. 3 and FIG. 5A are mainly used for explaining the working principles of the present invention, and is not the only way to realize the present invention, and those people of common knowledge in the art will readily observe that numerous alterations can be made according to various requirements. In FIG. 5A, the simulation switch unit 504 is used to simulate the conducting resistance of the lower gate switches SW2 and SW4, and because the lower gate switches SW2 and SW4 are made of the n-type MOSFETs SMN2 and SMN4, so the simulation switch unit 504 is to be realized by the n-type MOSFET MN5. According to the other embodiment of the present invention as depicted in FIG. 5B, the power control switches SW1~SW4 are all bipolar junction transistors. Inside it, the upper gate switches SW1, SW3 are made of the bipolar junction transistors SPNP1, SPNP3, respectively; the lower gate switches SW2, SW4 are made of the bipolar junction transistors SNPN2, SNPN4, respectively. Under this condition, since the simulation switch unit 504 is used for emulating the conducting resistance of the lower gate switches SW2, SW4, the simulation switch unit 504 has to be an NPN-type bipolar junction transistor MNPN5. And, the base of the transistor MNPN5 is connected to a current source reduced by RATIO times, and the emitter area is also reduced by RATIO times, and the operating principles of the present invention can also be applied.

Figure 5C:
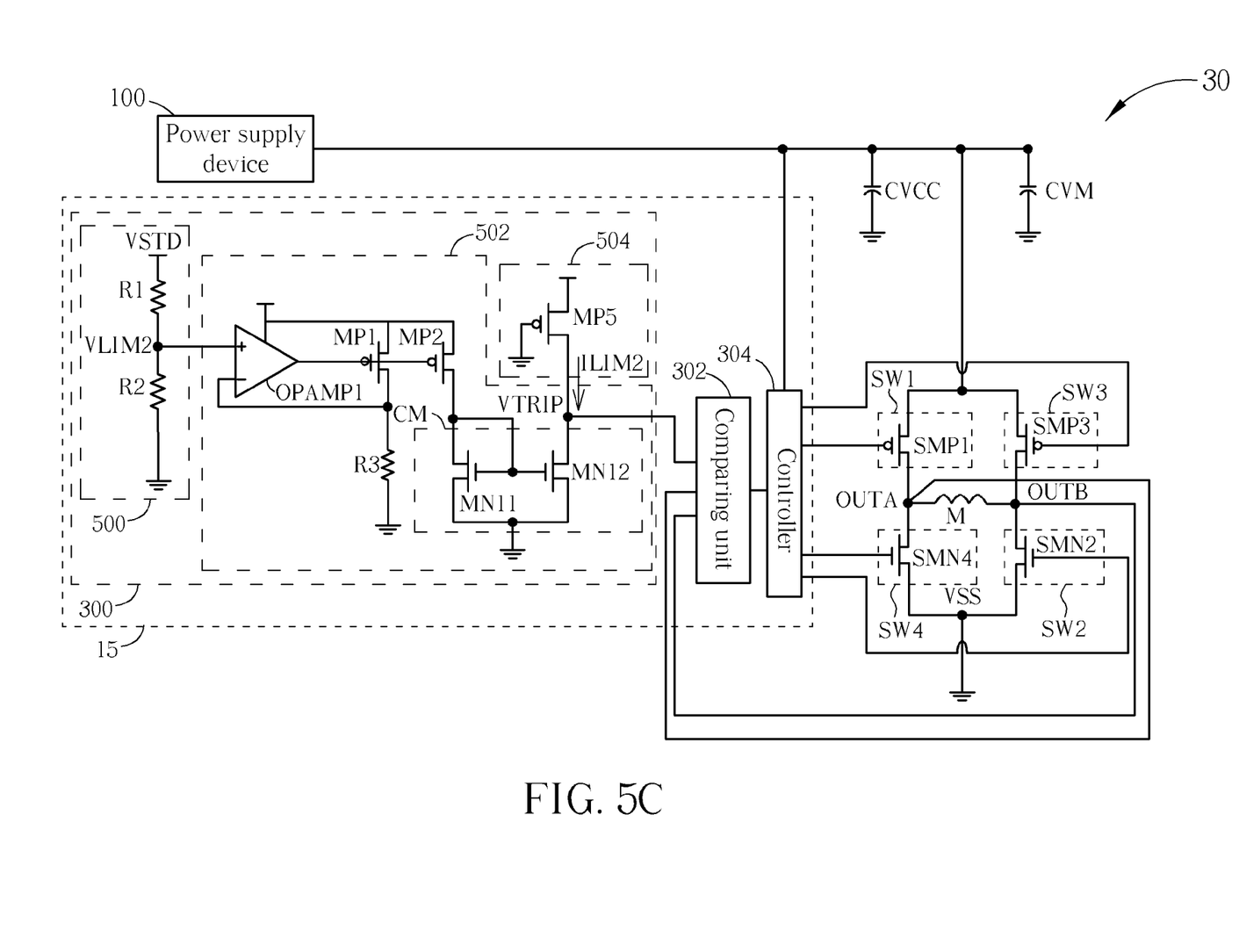

Besides that, as disclosed in FIG. 5C, the simulation switch unit 504 is used to emulate the conducting resistance of the upper gate switches SW1, SW3. Inside, the upper gate switches SW1, SW3 are made of p-type MOSFET SMP1, SMP3, respectively; the lower gate switch SMN2, SMN4 are made of the n-type MOSFET SMN2, SMN3. Under this condition, the simulation switch unit 504 has to be a p-type MOSFET MP5. Besides, to complete the circuit in FIG. 5C, the reference voltage generating unit 300 includes not only the operational amplifier OPAMP1, the resistor R3 and the p-type MOSFETs MP1, MP2, but also includes a current mirror CM. The current mirror CM includes the n-type MOSFETs MN11, MN12, and is used to supply a current to the transistor MP5 according to the magnitude of an input current, multiplied by a specified ratio. Noteworthily, the gate of the transistor MP5 has to be connected to the ground end, and the transistor MP5 is used to emulate the p-type MOSFETs SMP1 and SMP3 of the upper gate switches. Besides the above-mentioned transistors SMP1, SMP3, SMN2, SMN4 and MP5, the symbols and operating principles of the DC motor circuit 30 as depicted in FIG. 5C are all identical to those in FIG. 5A, and won't be detailed further.

Figure 5D:
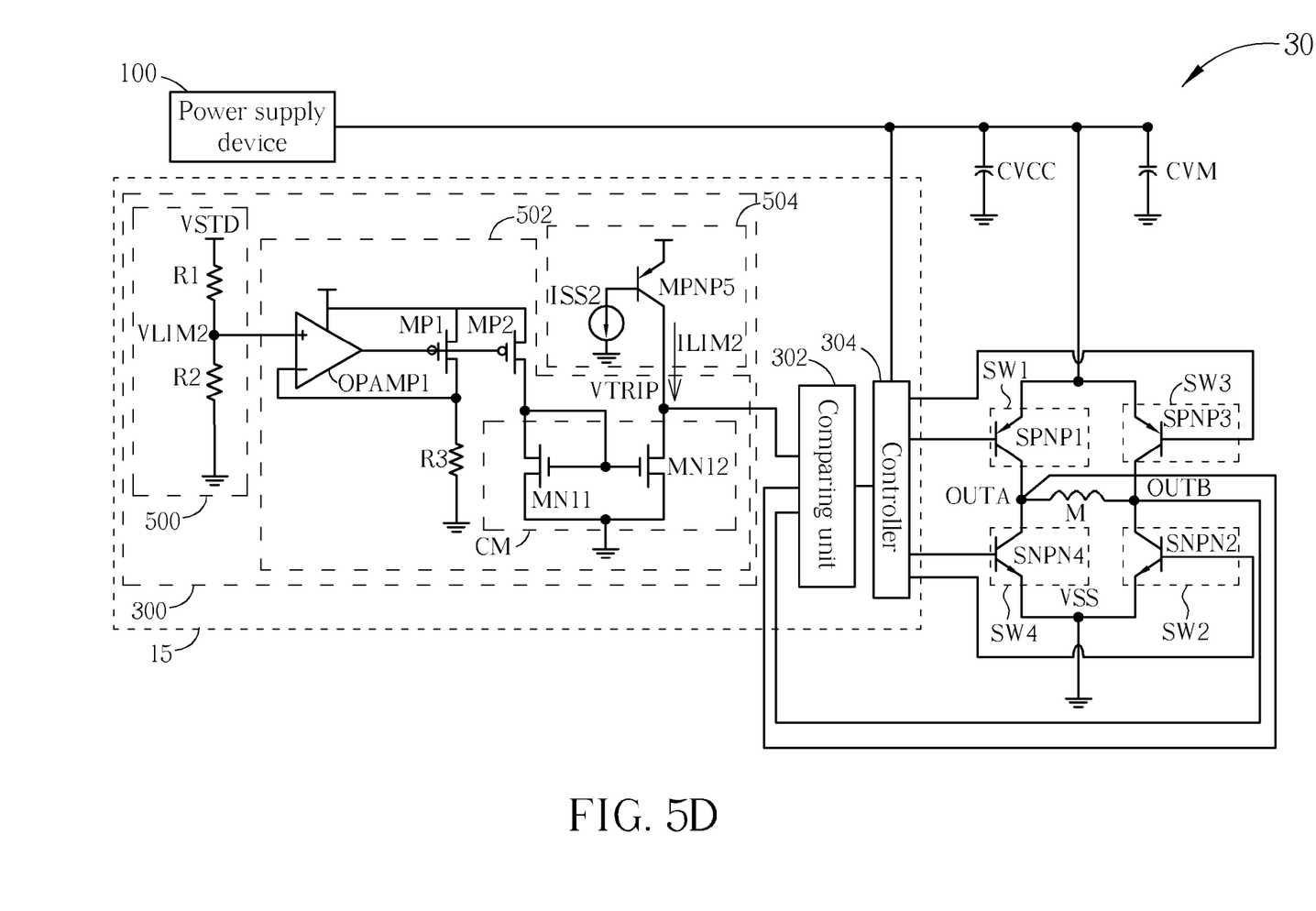

Following the architecture of the FIG. 5C, as depicted in FIG. 5D, where the upper gate switches SW1, SW3 are made of PNP-type bipolar junction transistors SPNP1 and SPNP3, respectively, and the lower gate switches SW2, SW4 are made of NPN-type bipolar junction transistors. Since the simulation switch unit 504 is used to simulate the conducting resistance of the upper gate switches SW1, SW3, so the simulation switch unit 504 has to be a PNP-type bipolar junction transistor MPNP5, the base of the transistor MPNP5 is coupled to a current source ISS2 reduced by RATIO times, and the area of the emitter is also reduced by RATIO times. Besides, a current mirror (made of MN11 and MN12) is used as a current source and as a load of the transistor MPNP5. The operating principles of the rest of the circuit are same to the above, and won't be detail further.

Besides, noteworthily, the transistors used in the upper gate switches SW1, SW3 and the transistors used in the lower gate switches SW2, SW4 are not necessarily be the same. In other words, it is not required that the upper gate switches SW1, SW3 and the lower gate switches SW2, SW4 are all bipolar junction transistors of NPN-type, or are all n-type MOSFETs. Actually, the upper gate switches SW1, SW3 and the lower gate switches SW2, SW4 are only designed to perform the functions of power control switches; therefore, as long as they can faithfully perform the function as a power switch, different types of the transistors can still be incorporated to perform the motor control functions. Under this condition, the present invention can still apply and the working principles are the same as above; the simulation switch unit 504 and other part of the circuit can be modified according to the types of transistors being used and have the same function and performance.

Therefore, the present invention may utilize resistors of much lower prices, and is easy to set the limit of motor current, and is no longer limited by the cost and accuracy of the high precision resistor. By using a scale-down version of the transistor to emulate and/or track the value of the resistance of the whole-scale transistor (power control switch), the present invention can prevent the environmental factor or some other non-ideal effects to affect the measurement of motor current; therefore, the value of the motor current can be correctly determined, and the motor current control can be effectively preformed.

To sum up, the present invention discloses the architecture of circuit for controlling the DC motor, and is much superior to the prior art in electrical energy saving as well as the accuracy of motor current measurement (or current detection). Besides, instead of using high power high precision resistors and the high precision comparator design, the establishment cost of the DC motor controller has been much lowered.

Those skilled in the art will readily observe that numerous modifications and alterations of the device and method may be made while retaining the teachings of the invention.

What is claimed is:

1. A control method of a current limit of a DC motor comprising:
    generating a reference voltage according to a preset current limit value of a DC motor;
    comparing the reference voltage with the voltage drop of a power control switch which drives the DC motor to generate a compare result; and
    controlling the power delivered to the DC motor according to the compare result in order to limit the current of the DC motor;
    wherein generating the reference voltage according to the preset current limit value of the DC motor comprises:
        generating a first voltage according to the preset current of the DC motor;
        providing a first current according to the first voltage; and
        converting the first current to the reference voltage.

2. The method of claim 1, wherein the value of the first current is equal to the value of the preset current divided by a preset value.

3. The method of claim 2, wherein the step of converting the first current to the reference voltage is performed by utilizing a simulation switch unit to convert the first current to the reference voltage, and the resistance of the simulation switch unit is correspondent to the conducting resistance of the power control switch multiplied by the preset value.

4. The method of claim 3, wherein the simulation switch unit is the conducting resistance of a field effect transistor, and the WL ratio of the field effect transistor is equal to the WL ratio of a field effect transistor, corresponding to the power control switch, divided by the preset value.

5. The method of claim 3, wherein the simulation switch unit is the conducting resistance of a bipolar junction transistor, and the emitter area of the bipolar junction transistor is equal to the emitter area, corresponding to the power control switch, divided by the preset value.

6. The method of claim 2, wherein the preset value is greater than 1.

7. The method of claim 1, wherein the power control switch is a lower gate switch of the DC motor circuit.

8. The method of claim 1, wherein the power control switch is an upper gate switch of the DC motor circuit.

9. The method of claim 1, wherein the compare result controls the power supply delivered to the DC motor, and is utilized to stop delivering current to the DC motor, while the compare result indicates the voltage of the power control switch adjacent to the DC motor is greater than the reference voltage.

10. A current limit device for controlling a DC motor comprising:
    a reference voltage generating unit, for generating a reference voltage according to a preset current limit value of a DC motor, comprising:
        a voltage generating unit, for generating a first voltage according to the preset current of the DC motor;
        a voltage to current conversion unit, for providing a first current according to the first voltage; and
        a simulation switch unit, for converting the first current to the reference voltage;
    a comparing unit, for comparing the reference voltage with the voltage drop of a power control switch which drives the DC motor to generate a compare result; and
    a control unit, for controlling the power delivered to the DC motor in order to limit the current of the DC motor according to the compare result.

11. The current limit device of claim 10, wherein the voltage generating unit comprises:
    a first resistor, coupled between a high voltage source and the voltage to current conversion unit; and
    a second resistor, with an end coupled to the first resistor and the voltage to current conversion unit, and another end coupled to a low voltage source.

12. The current limit device of claim 10, wherein the voltage to current conversion unit comprises:

an operational amplifier, comprising a first input end coupled to the voltage generating unit, a second input end, and an output end;
a resistor, comprising a first end coupled to the output end of the operational amplifier, and a second end coupled to a ground end;
a first p-type field effect transistor, comprising a gate coupled to the output end of the operational amplifier, a source coupled to a power source, and a drain coupled to the second input end of the operational amplifier; and
a second p-type field effect transistor, comprising a gate coupled to the output end of the operational amplifier, a source coupled to a power source, and a drain coupled to the simulation switch unit.

13. The current limit device of claim 12, wherein the resistance of the resistor is equal to the voltage value of the first voltage divided by the current value of the first current.

14. The current limit device of claim 12, wherein the simulation switch unit is an n-type field-effect transistor, and the n-type field effect transistor comprises:
a gate, coupled to a power source;
a source, coupled to a ground end; and
a drain, coupled to the voltage to current conversion unit and the comparing unit.

15. The current limit device of claim 14, wherein the WL ratio of the n-type field-effect transistor is equal to the WL ratio of an field effect transistor, corresponding to the power control switch, divided by the preset value.

16. The current limit device of claim 12, wherein the simulation switch unit is an NPN-type bipolar junction transistor, and the NPN-type bipolar junction transistor comprises:
a base, coupled to a current source;
an emitter, coupled to a ground end; and
a source, coupled to the voltage to current conversion unit and the comparing unit.

17. The current limit device of claim 16, wherein the emitter area of the NPN-type bipolar junction transistor is equal to the emitter area of an NPN-type bipolar junction transistor, corresponding to the power control switch, divided by the preset value.

18. The current limit device of claim 10, wherein the voltage to current conversion unit comprises:
an operational amplifier, comprising a first input end coupled to the voltage generating unit, a second input end, and an output end;
a resistor, comprising a first end coupled to the output end of the operational amplifier, and a second end coupled to a ground end;
a first p-type field effect transistor, comprising a gate coupled to the output end of the operational amplifier, a source coupled to a power source, and a drain coupled to the second input end of the operational amplifier; and
a second p-type field effect transistor, comprising a gate coupled to the output end of the operational amplifier, a source coupled to a power source, and a drain coupled to the simulation switch unit; and
a current mirror, for supplying the first current, comprising:
an input end;
an output end;
a first n-type field effect transistor, comprising a gate coupled to the output end of the operational amplifier, a source coupled to a power source, and a drain coupled to the second input end of the operational amplifier;
a second n-type field effect transistor, comprising a gate coupled to the gate of the first n-type field effect transistor, a source coupled to the ground end, and a drain coupled to the output end.

19. The current limit device of claim 18, wherein the resistance of the resistor is equal to the voltage value of the first voltage divided by the current value of the first current.

20. The current limit device of claim 18, wherein the p-type field effect transistor comprises:
a gate, coupled to a ground end;
a source, coupled to a power source; and
a drain, coupled to the voltage to current conversion unit and the comparing unit.

21. The current limit device of claim 20, wherein the WL ratio of the p-type field effect transistor is equal to the WL ratio of a field effect transistor, corresponding to the power control switch, divided by the preset value.

22. The current limit device of claim 18, wherein the simulation switch unit is a PNP-type bipolar junction transistor, and the PNP-type bipolar junction transistor comprises:
a base, coupled to a current source;
an emitter, coupled to a power source; and
a source, coupled to the voltage to current conversion unit and the comparing unit.

23. The current limit device of claim 22, wherein the emitter area of the PNP-type bipolar junction transistor is equal to the emitter area of a PNP-type bipolar junction transistor, corresponding to the power control switch, divided by the preset value.

24. The current limit device of claim 10, wherein the current value of the first current is equal to the current value of the preset current divided by a preset value.

25. The current limit device of claim 24, wherein the resistance of the simulation switch unit is correspondent to the conducting resistance of the power control switch multiplied by the preset value.

26. The current limit device of claim 24, wherein the preset value is greater than 1.

27. The current limit device of claim 10, wherein the power control switch is a lower gate switch of the DC motor circuit.

28. The current limit device of claim 10, wherein the power control switch is an upper gate switch of the DC motor circuit.

29. The current limit device of claim 10, wherein the control unit is utilized to stop delivering current to the DC motor, while the compare result indicates the voltage of the power control switch adjacent to the DC motor is greater than the reference voltage.

30. A motor control circuit for controlling a DC (direct-current) motor, for conducting current between a first end and a second end of the DC motor to generate kinetic energy, the motor control circuit comprising:
a power supply device, for supplying a DC power;
a plurality of power control switches, each comprising a first end, a second end and a third end, for controlling the signal connections between the first end and the third end, according to a signal of the second end;
a plurality of output ends, each coupled to a second end of a power control switch, for controlling the current conduction of the power control switch;
a first input end, coupled to the first end of the DC motor;
a second end, coupled to the second end of the DC motor; and
a current limit device, comprising:
a reference voltage generating unit, for generating a reference voltage according to a preset current limit value of a DC motor;
a comparing unit, coupled to the reference voltage generating unit, the first input end and the second input end, for selecting an input end between the first input end and the second input end, and comparing the voltage of the selected input end with the reference voltage to generate a compare result according to the direction of the motor current; and a control unit, coupled to the comparing unit, for controlling the power delivered to the DC motor according to the compare result, in order to limit the current of the DC motor.

31. The motor control circuit of claim 30, wherein the reference voltage generating unit comprises:

a voltage generating unit, for generating a first voltage according to the preset current of the DC motor;

a voltage to current conversion unit, for providing a first current according to the first voltage; and a simulation switch unit, for converting the first current to the reference voltage.

32. The motor control circuit of claim 31, wherein the voltage generating unit comprises:

a first resistor, coupled between a high voltage source and the voltage to current conversion unit; and a second resistor, with an end coupled to the first resistor and the voltage to current conversion unit, and another end coupled to a low voltage source.

33. The motor control circuit of claim 31, wherein the voltage to current conversion unit comprises:

an operational amplifier, comprising a first input end coupled to the voltage generating unit, a second input end, and an output end;

a resistor, comprising a first end coupled to the output end of the operational amplifier, and a second end coupled to a ground end;

a first p-type field effect transistor, comprising a gate coupled to the output end of the operational amplifier, a source coupled to a power source, and a drain coupled to the second input end of the operational amplifier; and a second p-type field effect transistor, comprising a gate coupled to the output end of the operational amplifier, a source coupled to a power source, and a drain coupled to the simulation switch unit.

34. The motor control circuit of claim 33, wherein the resistance of the resistor is equal to the voltage value of the first voltage divided by the current value of the first current.

35. The motor control circuit of claim 33, wherein the simulation switch unit is an n-type field-effect transistor, and the n-type field effect transistor comprises:

a gate, coupled to a power source;

a source, coupled to a ground end; and a drain, coupled to the voltage to current conversion unit and the comparing unit.

36. The motor control circuit of claim 35, wherein the WL ratio of the n-type field-effect transistor is equal to the WL ratio of an field effect transistor, corresponding to the power control switch, divided by the preset value.

37. The motor control circuit of claim 33, wherein the simulation switch unit is an NPN-type bipolar junction transistor, and the NPN-type bipolar junction transistor comprises:

a base, coupled to a current source;

an emitter, coupled to a ground end; and a source, coupled to the voltage to current conversion unit and the comparing unit.

38. The motor control circuit of claim 37, wherein the emitter area of the NPN-type bipolar junction transistor is equal to the emitter area of an NPN-type bipolar junction transistor, corresponding to the power control switch, divided by the preset value.

39. The motor control circuit of claim 31, wherein the voltage to current conversion unit comprises:

an operational amplifier, comprising a first input end coupled to the voltage generating unit, a second input end, and an output end;

a resistor, comprising a first end coupled to the output end of the operational amplifier, and a second end coupled to a ground end;

a first p-type field effect transistor, comprising a gate coupled to the output end of the operational amplifier, a source coupled to a power source, and a drain coupled to the second input end of the operational amplifier; and a second p-type field effect transistor, comprising a gate coupled to the output end of the operational amplifier, a source coupled to a power source, and a drain coupled to the simulation switch unit; and a current mirror, for supplying the first current, comprising:

an input end;

an output end;

a first n-type field effect transistor, comprising a gate coupled to the output end of the operational amplifier, a source coupled to a power source, and a drain coupled to the second input end of the operational amplifier;

a second n-type field effect transistor, comprising a gate coupled to the gate of the first n-type field effect transistor, a source coupled to the ground end, and a drain coupled to the output end.

40. The motor control circuit of claim 39, wherein the resistance of the resistor is equal to the voltage value of the first voltage divided by the current value of the first current.

41. The motor control circuit of claim 39, wherein the p-type field effect transistor comprises:

a gate, coupled to a ground end;

a source, coupled to a power source; and a drain, coupled to the voltage to current conversion unit and the comparing unit.

42. The motor control circuit of claim 41, wherein the WL ratio of the p-type field effect transistor is equal to the WL ratio of a field effect transistor, corresponding to the power control switch, divided by the preset value.

43. The motor control circuit of claim 39, wherein the simulation switch unit is a PNP-type bipolar junction transistor, and the PNP-type bipolar junction transistor comprises:

a base, coupled to a current source;

an emitter, coupled to a power source; and a source, coupled to the voltage to current conversion unit and the comparing unit.

44. The motor control circuit of claim 43, wherein the emitter area of the PNP-type bipolar junction transistor is equal to the emitter area of a PNP-type bipolar junction transistor, corresponding to the power control switch, divided by the preset value.

45. The motor control circuit of claim 31, wherein the current value of the first current is equal to the current value of the preset current divided by a preset value.

46. The motor control circuit of claim 45, wherein the resistance of the simulation switch unit is correspondent to the conducting resistance of the power control switch multiplied by the preset value.

47. The motor control circuit of claim 45, wherein the preset value is greater than 1.

48. The motor control circuit of claim 30, wherein the power control switch is a lower gate switch of the DC motor circuit.

49. The motor control circuit of claim 30, wherein the power control switch is an upper gate switch of the DC motor circuit.

50. The motor control circuit of claim 30, wherein the control unit is utilized to stop delivering current to the DC motor, while the compare result indicates the voltage of the power control switch adjacent to the DC motor is greater than the reference voltage.

* * * * *